Nov. 22, 1932.  E. J. RIVERS  1,888,807
MACHINE FOR SHAPING METAL TUBES
Filed March 18, 1932
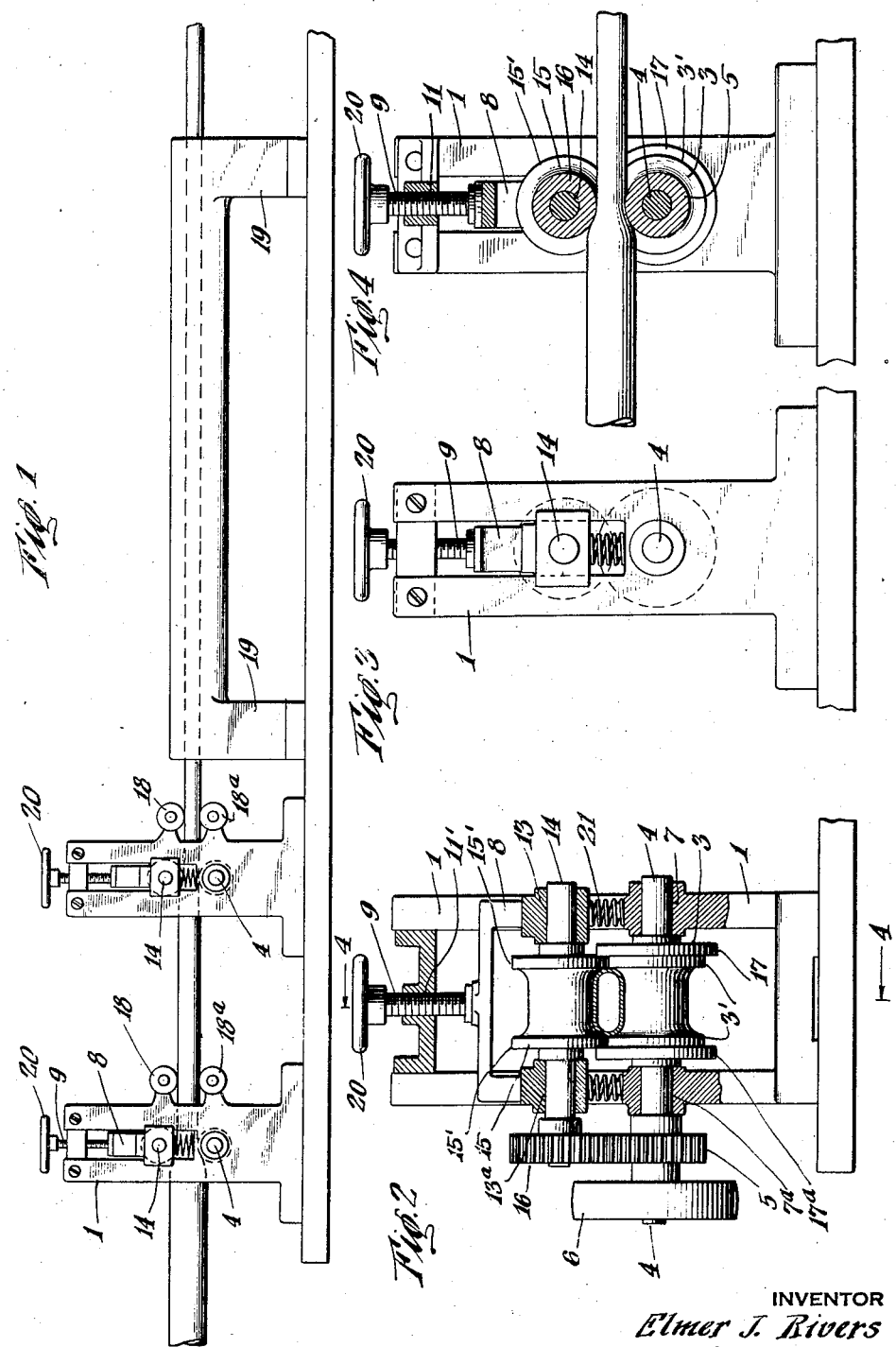
INVENTOR
*Elmer J. Rivers*
BY
*Hoquet & Meary*
ATTORNEYS Patented Nov. 22, 1932

1,888,807

UNITED STATES PATENT OFFICE

ELMER JAMES RIVERS, OF FARMINGDALE, NEW YORK, ASSIGNOR TO THE AVIATION PATENT AND RESEARCH CORPORATION, A CORPORATION OF NEW YORK

MACHINE FOR SHAPING METAL TUBES

Application filed March 18, 1932. Serial No. 599,683.

This invention relates to an improvement in an apparatus for compressing light metal tubing into predetermined shape for use as frame chord members in airplane wing ribs.

Heretofore there has been no apparatus provided for shaping tubing into the desired dimensions wherein it was possible to adjust the apparatus to secure a given dimension with any degree of accuracy.

It is therefore an object of this invention to provide an apparatus for readily changing circular tubes of light metal by compression into tubing of any predetermined cross-section whether oval or substantially so, within a given predetermined range, and further to provide an apparatus that will prevent the tubing, after it has been flattened into the desired shape, from bending.

With the foregoing and other objects in view, the invention consists in the combination of parts and in details in construction hereinafter set forth in the following specification and appended claim, certain embodiments being illustrated in the accompanying drawing, in which:

Figure 1 is a view in side elevation showing two apparatuses operating in series, and the trough for receiving the flattened tubing;

Figure 2 is a view in front elevation partly in section showing the oppositely rotating rollers;

Figure 3 is a view in side elevation; and

Figure 4 is a view in section taken along the line 4—4 of Figure 2.

Referring more particularly to the drawing, the particular device described herein in connection with the invention consists of a frame member 1 in which may be mounted an axle 4 on bearings 7—7a. On axle 4 and rigidly attached thereto within the supporting sides of frame member 1, is a roller member 3, and without the frame member 1 a belt wheel 6 and a gear 5, all of which are constructed to be rotated in a clockwise direction upon a rotative force being applied to the belt wheel 6. Upon frame member 1 may be mounted an adjustable frame member 8, which may be raised or lowered in relation to the stationary frame member 1 by the manipulation of the hand wheel 20 to operate the screw 9, to the lower end of which the frame member 8 is attached. This action takes place against the operation of compression springs 21 which tend to stabilize adjustments made in the device and throw the upper roller out of engagement with the lower roller and disengage gear 16 from gear 5 so as to stop the tube compressing operation in case of a stripping of the adjustment screw and consequent faulty adjustment. The screw 9 is meshed with a nut 11 set rigidly in the upper part of frame member 1. On frame member 8 on bearings 13 and 13a and directly above bearings 7 and 7a may be mounted an axle 14, to which is rigidly attached a roller member 15 within the supporting sides of frame members 1 and 8 and without the sides of frame members 1 and 8 the gear 16. The roller members 3 and 15 have opposed concave surfaces with shoulders 3' and 15' which latter abut or are substantially so related at all times that the space between the concave roller surfaces is such as to provide for the desired substantially oval shape of the finished frame chord tubing. The roller member 3 may have an outer flange 17 and 17a on either side, which will operate as a guide for the shoulders 15' of the roller 15 and prevent any lateral displacement of the roller member 15 during the operation. The auxiliary roller members 18 and 18a may be attached to the discharging end of the device to act as a support for the finished oval tubing. A supporting trough 19 may be attached to the apparatus at the point where the finished tubing leaves the auxiliary rollers 18 and 18a, and on the same plane, to receive said flattened tubing and prevent any lengthwise bending thereof. The gears 5 and 16 are equipped with teeth of longer than usual length. Thus the operating range of the device is between the point where the gears 5 and 16 mesh and the point of contact of the roller members 3 and 15.

The screw 9, when turned to the right, lowers the adjustable frame 8 and engages the gear 16 with the gear 5 and brings the roller members 15 and 3 substantially into contact.

A force applied to the belt wheel 6 will rotate gear 5 and roller 3 in a clockwise direction and cause the gear 16, when meshed, to rotate in a counter-clockwise direction, which will in turn cause roller member 15 to rotate in a counter-clockwise direction. The tubing between the roller members 3 and 15 will be flattened to the desired predetermined shape as it is being drawn through the said roller members and forced between the supporting roller members 18 and 18a to the supporting trough 19.

A suitable scale (not shown) may be provided so that the turning of the handwheel may obtain a precision adjustment of the space between the compressing rollers and the consequent tubing of predetermined gauge.

The showing in Figure 1 merely represents the possibility of compressing the tube in two stages in case it may be found desirable in a substantial alteration of the tube from its normal circular cross-section.

I claim:

A device for compressing and shaping tubes, including two roller members having opposed concave surfaces, and substantially abutting shoulders, means for rotating said roller members in opposite directions, and a single means for adjusting and maintaining the operating position of one of said roller members with respect to the other, one of said roller members having circular flanges at either end to engage and maintain the alignment of the shoulders of the other roller member, said adjustment means comprising a resilient means tending to separate said roller members and a manual adjustment member operable against the action of said resilient means, the latter being adapted to retain the device in each of its various adjusted positions and to force said roller members out of contact with each other and disengage the means for rotating said adjustable roller member upon the breakage or failure of said manual adjustment member rendering the latter incapable of overcoming the resistance of said resilient member.

In testimony whereof, I have signed my name to this specification this 14th day of March, 1932.

ELMER JAMES RIVERS.